US011305197B2

(12) United States Patent
Frazier

(10) Patent No.: US 11,305,197 B2
(45) Date of Patent: Apr. 19, 2022

(54) METHOD AND SYSTEM FOR FANTASY SPORTS DRAFTING

(71) Applicant: Mitchell Frazier, Roseville, CA (US)

(72) Inventor: Mitchell Frazier, Roseville, CA (US)

( * ) Notice: Subject to any disclaimer, the term of this patent is extended or adjusted under 35 U.S.C. 154(b) by 58 days.

(21) Appl. No.: 15/969,051

(22) Filed: May 2, 2018

(65) Prior Publication Data

US 2018/0318720 A1 Nov. 8, 2018

Related U.S. Application Data

(63) Continuation-in-part of application No. 13/406,520, filed on Feb. 27, 2012.

(60) Provisional application No. 61/447,095, filed on Feb. 27, 2011.

(51) Int. Cl.
| | |
|---|---|
| *A63F 13/00* | (2014.01) |
| *A63F 13/828* | (2014.01) |
| *A63F 13/77* | (2014.01) |
| *A63F 13/65* | (2014.01) |
| *A63F 13/335* | (2014.01) |
| *A63F 13/792* | (2014.01) |
| *A63F 13/798* | (2014.01) |

(52) U.S. Cl.
CPC .......... *A63F 13/828* (2014.09); *A63F 13/335* (2014.09); *A63F 13/65* (2014.09); *A63F 13/77* (2014.09); *A63F 13/792* (2014.09); *A63F 13/798* (2014.09); *A63F 2300/8052* (2013.01)

(58) Field of Classification Search
CPC ....... A63F 13/828; A63F 13/79; A63F 13/795
See application file for complete search history.

(56) References Cited

U.S. PATENT DOCUMENTS

| | | | | |
|---|---|---|---|---|
| 2002/0107073 | A1* | 8/2002 | Binney | A63F 13/12 463/42 |
| 2008/0281444 | A1* | 11/2008 | Krieger | A63F 13/828 700/91 |
| 2009/0270172 | A1* | 10/2009 | Sorrells | A63F 13/828 463/42 |
| 2010/0203936 | A1* | 8/2010 | Levy | A63F 13/12 463/4 |

* cited by examiner

*Primary Examiner* — Omkar A Deodhar
*Assistant Examiner* — Eric M Thomas
(74) *Attorney, Agent, or Firm* — John P. Costello

(57) ABSTRACT

A system and method for drafting and managing a fantasy sports team. A method for managing a fantasy sports leagues, tournaments or contests on a plurality of remote devices having instructions stored on a non-transitory computer readable medium, the devices being communicatively connected to a network, comprising pairing user-ranked lists to draft for each position independently. A system for managing a fantasy sports team, comprising a plurality of remote devices having instructions stored on a non-transitory computer readable medium, the devices being communicatively connected to a database over a network, wherein the system is configured to draft players for each position from user-ranked lists.

21 Claims, 3 Drawing Sheets

| Blue Team RB Quiver | Red Team RB Quiver |
|---|---|
| #1. Le'von Bell | #1. Ezekiel Elliott |
| #2. Ezekiel Elliott | #2. Le'von Bell |
| #3. Eddie Lacey | #3. Eddie Lacey |
| #4. Jay Ajayi | #4. Jay Ajayi |
| #5. Todd Gurley | #5. C.J. Anderson |
| #6. DeMarco Murray | #6. Todd Gurley |
| #7. C.J. Anderson | #7. DeMarco Murray |
| #8. Kareem Hunt | #8. Kareem Hunt |
| #9. Doug Martin | #9. Alfred Morris |
| #10. Alfred Morris | #10. Frank Gore |
| #11. Lamar Miller | #11. LeSean McCoy |
| #12. LeSean McCoy | #12. Doug Martin |
| #13. Thomas Rawls | #13. Latavius Murray |
| #14. Daren McFadden | #14. Thomas Rawls |
| #15. Latavius Murray | #15. Lamar Miller |
| #16. Carlos Hyde | #16. Paul Perkins |
| #17. Paul Perkins | #17. Carlos Hyde |
| #18. Melvin Gordon | #18. Melvin Gordon |
| #19. Jamal Charles | #19. Ryan Mathews |
| #20. Legarrette Blount | #20. Jamal Charles |

| Blue Team RB Quiver | Red Team RB Quiver |
| --- | --- |
| #1. Le'von Bell | #1. Ezekiel Elliott |
| #2. Ezekiel Elliott | #2. Le'von Bell |
| #3. Eddie Lacey | #3. Eddie Lacey |
| #4. Jay Ajayi | #4. Jay Ajayi |
| #5. Todd Gurley | #5. C.J. Anderson |
| #6. DeMarco Murray | #6. Todd Gurley |
| #7. C.J. Anderson | #7. DeMarco Murray |
| #8. Kareem Hunt | #8. Kareem Hunt |
| #9. Doug Martin | #9. Alfred Morris |
| #10. Alfred Morris | #10. Frank Gore |
| #11. Lamar Miller | #11. LeSean McCoy |
| #12. LeSean McCoy | #12. Doug Martin |
| #13. Thomas Rawls | #13. Latavius Murray |
| #14. Daren McFadden | #14. Thomas Rawls |
| #15. Latavius Murray | #15. Lamar Miller |
| #16. Carlos Hyde | #16. Paul Perkins |
| #17. Paul Perkins | #17. Carlos Hyde |
| #18. Melvin Gordon | #18. Melvin Gordon |
| #19. Jamal Charles | #19. Ryan Mathews |
| #20. Legarrette Blount | #20. Jamal Charles |

Fig. 1

| Blue Team RB Draft | | Red Team RB Draft |
|---|---|---|
| #1. Le'von Bell | Drafted | #1. ~~Ezekiel Elliott~~ |
| #2. ~~Ezekiel Elliott~~ | Gone | #2. ~~Le'von Bell~~ |
| #3. ~~Eddie Lacey~~ | Matched | #3. ~~Eddie Lacey~~ |
| #4. ~~Jay Ajayi~~ | Matched | #4. ~~Jay Ajayi~~ |
| #5. Todd Gurley | Drafted | #5. C.J. Anderson |
| #6. ~~DeMarco Murray~~ | | #6. ~~Todd Gurley~~ |
| #7. ~~C.J. Anderson~~ | | #7. ~~DeMarco Murray~~ |
| #8. ~~Kareem Hunt~~ | | #8. ~~Kareem Hunt~~ |
| #9. ~~Doug Martin~~ | | #9. ~~Alfred Morris~~ |
| #10. ~~Alfred Morris~~ | | #10. ~~Frank Gore~~ |
| #11. ~~Lamar Miller~~ | | #11. ~~LeSean McCoy~~ |
| #12. ~~LeSean McCoy~~ | | #12. ~~Doug Martin~~ |
| #13. ~~Thomas Rawls~~ | | #13. ~~Latavius Murray~~ |
| #14. ~~Daren McFadden~~ | | #14. ~~Thomas Rawls~~ |
| #15. ~~Latavius Murray~~ | | #15. ~~Lamar Miller~~ |
| #16. ~~Carlos Hyde~~ | | #16. ~~Paul Perkins~~ |
| #17. ~~Paul Perkins~~ | | #17. ~~Carlos Hyde~~ |
| #18. ~~Melvin Gordon~~ | | #18. ~~Melvin Gordon~~ |
| #19. ~~Jamal Charles~~ | | #19. ~~Ryan Mathews~~ |
| #20. ~~Legarrette Blount~~ | | #20. ~~Jamal Charles~~ |

Fig. 2

Blue Team's Starting RB's    Red Team's Starting RB's

1. Le'von Bell    #1. Ezekiel Elliott

2. Todd Gurley    #2. C. J. Anderson

Fig. 3

METHOD AND SYSTEM FOR FANTASY SPORTS DRAFTING

CROSS-REFERENCES TO RELATED APPLICATIONS

The present application is a continuation in part of U.S. Non-Provisional application Ser. No. 13/406,520 filed on Feb. 27, 2012, which claims priority from U.S. Provisional Application Ser. No. 61/447,095 filed on Feb. 27, 2011, which are each hereby incorporated herein by reference in their entirety.

TECHNICAL FIELD

The present invention, in some embodiments thereof, relates to systems for managing and drafting fantasy sports contests.

BACKGROUND OF THE INVENTION

Current fantasy sports platforms rely on real professional sports games. When a professional team suffers an issue, the fantasy sports team also suffers. The question is, where is the fantasy in today's fantasy contests.

The original system of fantasy gaming is over fifty years old, with the only other fantasy option being over 25 years old. In 2017 there were over 60,000,000 fantasy gamers who invested over $5.1 billion in these two fantasy concepts.

The original fantasy game is a one time, three hour draft, that takes place prior to the start of the season. This drafting platform begins with a randomly selected draft order, usually #1 through #12 and returning in the second round #12 to #1. This drafting method is known as a serpentine or snake draft. Years of statistics reveal this method of play favors teams that draft in the top 4 drafting positions vs. the teams that draft late in their draft. The serpentine draft is time consuming, taking many hours to prepare to draft 17 players from a 2,000 member player pool. In addition to the original draft, serpentine drafting contests require an additional 1 to 3 hours a week searching team rosters and ranking players for the weekly waiver-wire draft, which is drafted in the "reverse order" to your current contest standings. (If your team is in first place, you would have the last pick in the weekly waiver-wire draft.) Add in player injuries, team bye weeks, league suspensions and undependable player reports and serpentine fantasy contests have become extremely complicated to play.

The second method of fantasy play is known as a Salary Cap game, which is a non-drafting method but rather a gaming system, controlled by the company offering salary cap contest, that offers a random amount of fake money ($60 M+/−) to purchase professional players at a predetermined dollar value. (Example: Tom Brady could have a purchase price tag of $24 M or over one third of the teams spending cap.) As you can see, this method of play makes selecting top tier professional players extremely expensive to acquire, knowing you need to fill a 9 man team roster, thus forcing fantasy gamers to select unknown or lower level pros to fill their contest rosters. This results with most users only being able to afford a few of the top pros to fill their lineup; in most cases, users are forced in to selecting the same top professional players as other users in their contest. In the end, many users end up with identical player rosters. The largest issue with Salary Cap contests is professionally created and privately purchased algorithms that have taken over this style of game, which makes Salary Cap games unfair for the average gamer. Today, Salary Cap contests are ruled by those who can build or buy the best algorithm.

The present invention, the Quiver Drafting System, establishes a completely new system of play and a new method for managing and drafting fantasy sports contests. The invention solves the majority of the previously mentioned problems due to the fact that it functions independently of both current systems. The invention requires less time, allows for a fair draft, for every user, every week of the contest. The invention does not depend on a computer driven drafting order, doesn't involve a reverse order waiver-wire draft or having to select a team based on a company's view of a players value or the user's ability to buy a computerized algorithm.

The present invention provides a player organizer (The Drafting Quiver) that allows every user the opportunity to rank and draft (1 through 20) any and every pro player, every week of their contest. All players a free agents, every week of the year. Once the user ranks its players, by position (Quarterback, Running Back, Wide Receiver, Tight End, Kicker and a team Defense), the system lays the users ranked players, side by side, and drafts players from the top down (#1 through #20) every week of the contest, all season long.

The Quiver Drafting System replaces all matching players with the next highest-ranked player in each teams quiver. (Example: If user #1 has Tom Brady ranked as their #1 Quarterback and his weekly opponent, user #2, has Tom Brady ranked as their #1 Quarterback, then Tom Brady will be removed from both teams weekly draft. If user #1 has Aaron Rogers as their second ranked quarterback and user #2 has Drew Brees as their second ranked quarterback, the system will slot Aaron Rogers as user #1's starting QB and slot Drew Brees as user #2's starting QB for that one week of play. Quiver Drafting removes two of the main issues in fantasy sports, "draft order superiority and the reverse order waiver-wire."

BRIEF SUMMARY OF THE EMBODIMENTS OF THE INVENTION

In a variant, a method for managing a fantasy sports league on a plurality of remote devices having instructions stored on a non-transitory computer readable medium, the devices being communicatively connected to a network, providing a plurality of players from teams of a professional sports league on a database; connecting each device to the database over the network; receiving input from each device using an interface to select players from the database and organize the players into a ranked list, for each drafting position; storing the selections made through the interface on each device on the database; placing one fantasy team against a second fantasy team for a fantasy contest; that removes identically-ranked players from each teams organized list and replacing an identically-ranked player with a next highest-ranked player in each teams personally ranked drafting quiver.

In another variant, the method comprises displaying the first users ranked list of 20 players, side by side, with the ranked list of a second users top 20 players. Quiver Drafting allows the user to rank their top 20 draft choices for all six drafting positions. The system lays each users highest-ranked next to each other. If they are a match (same player) the matched player is removed from both teams drafting quiver and the system moves on to the next highest ranked player. The side by side, top to bottom, player draft provides an equally fair and balanced draft for every team, every week of the season.

In a further variant, the method comprises using placeholders for players.

In yet another variant, the method comprises selecting and ranking players for each drafting position.

In another variant, the method comprises forming a different fantasy team for each fantasy game using the users ranked players from each of the drafting position.

In a further variant, the method comprises selecting and ranking players prior to a fantasy game.

In yet another variant, the method comprises duplicating a finalized drafting quiver to clone current player rankings for all new team quivers.

In another variant, the method comprises notifying both users to make at least one player adjustment when both users ranked lists (1 through 20) are identically matched.

In a further variant, the method comprises scoring the fantasy games and posting fantasy game results to the database to proclaim a winner.

In yet another variant, a system for managing a fantasy sports team, comprising a plurality of remote devices having instructions stored on a non-transitory computer readable medium, the devices being communicatively connected to a database over a network. The database comprises a plurality of players from teams of professional leagues; and each device has an interface that is configured to select players from the database and organize the players into a ranked list for each of the six drafting positions. The interface is configured to place one fantasy teams drafting list, side by side, against another fantasy team to form a fantasy contest. The interface is also configured to remove identically-ranked players from each ranked list and replace an identically-ranked player with a next highest-ranked player from each user's ranked player list.

In another variant, the system is configured to display a ranked list of players from a first user, next to a ranked list of a second user, and draft from a highest-ranked player to a lowest-ranked player (1 through 20) for each users drafting quiver.

In a further variant, the system comprises placeholders for players.

In yet another variant, the interface is configured to accept an arrangement of ranked players for each of the six drafting positions.

In another variant, the interface is configured to form a fantasy team comprising a different arrangement of players for each fantasy game using the ranked players for each drafting position.

In a further variant, the interface is configured to perform weekly, one on one, head to head drafts.

In a further variant, the interface is configured to conduct games' draft's head to head, one-on-one against every team in the contest on a daily and weekly basis.

In a further variant, the interface is configured to accept an arrangement of ranked players.

In yet another variant, the interface comprises an option to duplicate a finalized ranked list so that any other ranked lists for the same drafting position are updated to reflect the finalized player rankings.

In another variant, the interface is configured to notify both users to make at least one player adjustment when both ranked lists for the same drafting position are identical.

In a further variant, the interface is configured to score the fantasy games, according to the contests scoring system, and post each fantasy games results to the database.

In yet another variant, the interface is configured to accept money payments and distribute money to the contest winners.

In another variant, the interface is configured to receive and organize fantasy teams into various leagues, tournaments and contests.

BRIEF DESCRIPTION OF THE DRAWINGS

FIG. 1 illustrates two running back drafting quivers with ranked players.

FIG. 2 illustrates a draft of running backs from both teams' running back quivers.

FIG. 3 illustrates a selection of drafted running backs for each team's starting lineup.

DETAILED DESCRIPTION OF THE EMBODIMENTS OF THE INVENTION

Referring generally to FIGS. 1-3, the present invention is directed toward a computer implemented fantasy sports drafting system, where users select and rank professional sports players to form a fantasy team for any type of sport. The system has a processor and computer readable instructions stored on a non-transitory memory, that when executed by the processor, carry out a method of fantasy sports drafting and games. In one example variant of the system, the system comprises drafting quivers. Drafting quivers are ranked lists comprising placeholders for up to 20 players, used as a draft organizer for a weekly head-to-head drafts. The weekly head-to-head draft places two fantasy sports participants in a head-to-head competition to select, draft, the best fantasy team to score the most points before games or matches that are immediate upcoming. Each participant is an owner of a fantasy team which comprises players selected by the owner. A contest game page provides access to drafting quivers, one for each of the six drafting positions. For example, in American football, there may be 6 drafting positions, 6 drafting quivers, but any number may be utilized for any given sport. For example, the six positions drafted are quarterback (QB) quiver, running back (RB) quiver, wide receiver (WR) quiver, tight end (TE) quiver, kicker (K) quiver and a defensive (D) team quiver. Once a draft begins, the quiver drafting system of the present invention takes each team's drafting quivers, displays them side-by-side, and drafts head-to-head, from the top to the bottom of the 20 player drafting quiver.

In another variant, drafting quivers are found next to the NFL Player Pool in the system. Six drafting quivers are open with 20 blank drafting slots. To prepare for a draft, a participant selects 20 of their most desired players, from the NFL player pool into the teams drafting quiver, for example, by clicking on green player arrow that moves a player from the player pool and in to their drafting quiver, with a mouse cursor. After the user arrows over a player into the drafting quiver, the user may adjusts the drafting order, by dragging and dropping the players up or down the 20 slot drafting quiver, as often as needed until thirty minutes prior to the start of each week's first game. Otherwise, drafting quivers maintain their prior player order, from week to week, or until the owner makes an actual player adjustment.

In a further variant, a player is removed from its drafting quiver and returned to the player pool by clicking on a green arrow found to the right of the player's name. The removed player automatically returns to their statistical position in the NFL player pool. The user may also choose to duplicate a finalized drafting quiver, by clicking on the blue Duplicate Quiver button, to copy the current drafting quiver over to the users other contest quivers.

In another variant, each of the six drafting positions (QB, RB, WR, TE, K and D) has its own 20 slot drafting quiver.

In a further variant, NFL player pools are separated by position and listed in statistical order. Player pools are displayed next to their drafting quiver. For example, the quarterback player roster is displayed adjacent to the quarterback drafting quiver. To access quivers, an owner navigates through the flow of the web site.

In yet another variant, the system drafts players for each game from the drafting quivers. First, a first team's quiver for a first position is displayed adjacent to the second user's quiver for a first position. For example, the quarterback quiver of one competitor is displayed side by side with the quarterback quiver of a second competitor. Next, the system drafts from the top of the quiver (#1 through #20) to the bottom of the quiver.

If the system detects a matched player (same name player) the system removes the identically-ranked player from each teams quiver and replaces each identically-ranked player with the next highest-ranked player in each quiver. The system designates the identically-ranked player as a matching player and removes the matched player from that week's head to head draft. If both the first-ranked and second-ranked positions in both quivers have matching players, then both players are eliminated from the draft. This elimination of matched players the system continues down the quiver until the system detects unmatched players until the player drat has concluded. If both quivers are fully matched, meaning the quivers ranked the same players in the same order, 1 through 20, the system notifies the users to make at least a one player adjustment by alerting the users with a "red flag" on their contest portal and in an email. The system then repeats the above steps for the remaining five drafting positions. See the following examples:

Quarterback Example #1: A first competitor's quarterback quiver has Drew Brees ranked as their number one quarterback and the second users quarterback quiver has Aaron Rogers ranked as their number one quarterback, the system will draft Drew Brees as the starting quarterback for the first users team and draft Aaron Rogers as the opponent's starting quarterback.

Quarterback Drafting Example #2: A first competitor's quarterback quiver ranks Drew Brees as the number one quarterback and the opponent's quarterback quiver ranks Drew Brees as the number quarterback. The system will remove Drew Brees from both teams' quarterback quivers. Drew Brees is now designated as a matched player by the system and moves on to the next highest ranked QB in each teams QB quiver. This process continues until the two users differ in opinion on the ranking of their QB quiver.

In another variant, the system scores the fantasy games and posts fantasy game results live to the database. The system also accepts money payments and organizes fantasy teams into various leagues, tournaments and contests.

The computer implemented method for managing fantasy sports leagues is carried out by the system on a plurality of remote devices, the devices being communicatively connected to a network, and have instructions stored on a non-transitory computer readable medium that when executed by a computer processor, cause the processor to execute the method. The devices are communicatively connected to a network. The method executed by the processor comprises: providing a plurality of players from teams of a league on a database; connecting each device to the database over the network; receiving input from each device using an interface to select players from the database and organize the players into a ranked list for drafting a team of players; storing the selections made through the interface on each device on the database; placing a first fantasy team against a second fantasy team for a fantasy game; drafting players from each team's ranked player lists; and removing identically-ranked players from each ranked list and replacing an identically-ranked player with a next highest-ranked player on each ranked list.

What is claimed is:

1. A computer implemented method for managing fantasy sports leagues on a plurality of remote devices, the devices being communicatively connected to a network, and having instructions stored on a non-transitory computer readable medium that when executed by a computer processor, cause the processor to execute the method comprising:
   providing a plurality of players from teams of a league on a database;
   connecting each device to the database over a network;
   receiving input from each device using an interface to select players from the database;
   organizing the players into a ranked player list for drafting a drafting position on a fantasy team of players, wherein each player occupies a ranking on the ranked player list for a drafting position;
   storing the ranked player list selections made through the interface on each device on the database;
   comparing the ranked player list for a drafting position of a first fantasy team against the ranked player list for the same drafting position of a second fantasy team;
   removing identical players occupying the same ranking for a drafting position on both the first fantasy team and second fantasy team;
   advancing down the rankings for a drafting position of both ranked player lists of the first fantasy team and the second fantasy team until identically-ranked non-identical players occur, thereby indicating a difference of opinion between the ranked player lists of the first fantasy team and the second fantasy team; and
   drafting players from the ranked player list for a drafting position on the first fantasy team and the second fantasy team at the point where the identically-ranked non-identical players occur.

2. The computer implemented method for managing fantasy sports leagues as recited in claim 1, further comprising drafting additional players from the same ranked player list for a drafting position or from additional ranked player lists for additional drafting positions until all drafting positions are filled on the first fantasy team and the second fantasy team.

3. The computer implemented method as recited in claim 1, further comprising displaying a ranked list of a first user next to a ranked list of a second user and drafting from a highest-ranking player to a lowest-ranking player of each user's ranked lists.

4. The computer implemented method as recited in claim 1, further comprising using placeholders for players.

5. The computer implemented method as recited in claim 1, wherein the games further comprise one user versus one user where drafts occur daily and/or weekly, in a plurality of drafting leagues, tournaments and contests.

6. The computer implemented method as recited in claim 1, further comprising one user drafting one-on-one against a plurality of users on a weekly and daily basis.

7. The computer implemented method as recited in claim 1, further comprising forming a different fantasy team for each fantasy game using a ranked list of players for each drafting position.

8. The computer implemented method as recited in claim 1, further comprising duplicating a finalized ranked player list so that any other ranked lists for the same drafting position are updated to reflect the finalized ranked player list.

9. The computer implemented method as recited in claim 1, further comprising notifying both users to make at least one player adjustment when both ranked player lists for the same drafting position are identical.

10. The computer implemented method as recited in claim 1, further comprising scoring the fantasy games and posting fantasy game results to the database.

11. A system for managing a fantasy sports team comprising:
- a plurality of remote devices having instructions stored on a non-transitory computer readable medium executable by a processor, the devices being communicatively connected to a database over a network;
- wherein the database comprises a plurality of players from teams of a league;
- wherein each device has an interface that is configured to select players from the database and organize the players into a ranked player list for drafting at least one drafting position;
- wherein the interface is configured to place side-by-side the ranked player list of a first fantasy team of a first user against a ranked player list of a second fantasy team of a second user
- the system being configured to advance top-to-bottom down the ranked player lists of the first fantasy team of the first user and the second fantasy team of the second user and detect matching identical players on the player lists of the first fantasy team of the first user and the second fantasy team of the second user;
- the system being configured to remove from the draft matching identical players on the ranked player list of the first fantasy team of the first user and the ranked player list of the second fantasy team of the second user;
- the system being configured to advance down the rankings for a drafting position of both ranked player lists of the first fantasy team of the first user and the second fantasy team of the second user until non-matching identically-ranked players occur, thereby indicating a difference of opinion between the ranked player lists of the first fantasy team of the first user and the second fantasy team of the second user; and
- drafting players from the ranked player list for a drafting position on the first fantasyteam of the first user and the second fantasy team of the second user at the point where the non-matching identically-ranked players occur.

12. The system of claim 11, wherein the system is configured to display a ranked player list of the first user, side by side, with a ranked player list of the second user and draft from a highest-ranked player to a lower-ranked player of each user.

13. The system of claim 11, wherein the system comprises placeholders for players.

14. The system of claim 11, wherein the interface is configured to accept an arrangement of up to 20 ranked players for each drafting position.

15. The system of claim 11, wherein the interface is configured to form a fantasy team comprising a different arrangement of players for each fantasy game using up to 20 ranked players for each drafting position.

16. The system of claim 15, wherein the interface is configured to accept an arrangement of ranked players until up to 30 minutes prior to a fantasy game.

17. The system of claim 11, wherein the interface comprises an option to duplicate a finalized ranked player list so that any other ranked player lists for the same drafting position are updated to reflect the finalized ranked player list.

18. The system of claim 11, wherein the interface is configured to notify both users to make at least one player adjustment when both ranked player lists for the same drafting position are identical.

19. The system of claim 11, wherein the interface is configured to score the fantasy games and post fantasy game results to the database.

20. The system of claim 11, wherein the interface is configured to accept money payments and distribute money payments to contest winners.

21. The system of claim 11, wherein the interface is configured to receive and organize fantasy teams into various leagues, tournaments and contests.

* * * * *